Patented Apr. 24, 1945

2,374,626

UNITED STATES PATENT OFFICE 2,374,626

METHOD OF FORMING A STABILIZED FROTH AND MATERIAL THEREFOR

Nathaniel L. Smith, Los Angeles, Calif., assignor to Process Holdings Company, a corporation of Oregon No Drawing. Application October 26, 1939, Serial No. 301,470

8 Claims. (Cl. 106—122)

This invention relates to a frothing composition and more particularly to frothing compounds containing rosin or its essential derivative, abietic acid, as a whipping agent for facilitating formation and maintenance of a stable foam.

Among the objects of this invention are to provide a frothing or whipping agent of general application in any neutralized environment of material which is susceptible of maintaining a stabilized foam. By employing the term neutralized, it is not intended that the environment must be translated absolutely to a neutral condition; a positive alkaline condition is just as adaptable, and is preferable. An acid solution to be frothed properly must be neutralized provided the viscosity is such to sustain a stabilized foam. However, a greater degree of efficiency is to be found in a positive alkaline environment.

Broadly stated, the invention consists in the inclusion of rosin (colophony) which is essentially abietic acid, as a whipping agent in solutions having sufficient inherent viscosity from any source to sustain a stabilized foam, and more specifically to such viscous solutions which are neutral or positively alkaline at the time of whipping or frothing, regardless of whether such status arises from alkalinity resulting from a saponification treatment of the rosin, or from alkalinity of contents of the product to be whipped and into which rosin is introduced prior to its saponification.

As an addition-stock solution which may have many uses as an agent to facilitate frothing, a saponified rosin, resinate, abietate, or rosin soap may be prepared by saponifying a suitable grade of either wood rosin or common rosin with a hot or cold caustic solution. The caustic may be sodium hydroxide, potassium hydroxide, or the equivalent carbonates of either, aqua ammonia, or any similar source of soluble alkalinity. Such saponification of the rosin in fact produces the soluble salt of the rosin or the abietic acid. The best results are obtained if sufficient alkali is used to more than neutralize all of the acid and leave a resulting solution of alkaline condition, although this is not absolutely essential, although the extent or degree of effectiveness as a frothing agent is largely determined by a positive alkaline environment of the saponified rosin at the time of the whipping operation.

One example which may be followed for saponification of the rosin is to heat to a boiling point a solution of 27 lbs. of 98% sodium hydroxide in 300 lbs. of water. To this solution is added 140 lbs. of pulverized "B" grade wood rosin. This is kept and stirred at approximately 200° F. for several hours, three hours having been found sufficient, and then diluted with water to the desired consistency. The original preparation is quite viscous and sticky when cold. On further dilution, as for example by the adidtion of another 200 lbs. of water to the above finished mix, a free flowing "oily" consistency is obtained. This makes a stock solution convenient to handle. In water dilutions where the content of rosin is less than 10% by weight of the total fluid weight a solution of remarkable frothing qualities is obtained. In practice, the content of rosin (in the form of its saponified product) is generally much less than 10% by weight of the total. The inventor has produced satisfactory foams where the content of rosin (as its saponified product) was as little as one-tenth of one per cent (0.1 of 1%) of the total fluid weight.

It is not to be understood that the foregoing solution when added to every liquid product will provide a stabilized foam. To produce a stable foam it is necessary to incorporate other ingredients into the solution, or introduce this saponified rosin solution into other ingredients, which provide sufficient viscosity to maintain a stabilized foam after it is produced. For this purpose, one may employ protein substances such as casein, gelatin, albumen, etc., or their glues, sugar substances such as sucrose or glucose, or cellulose substances such as starch glues. Use can also be made of inert earthy mineral colloids or suspensions such as silicates, clays, bentonite, diatomaceous earth, magnesia, or asbestos fibres, which do not chemically "set" by moistening and thereafter drying, since that type of material is usually heavy, hard and brittle when "set." As a rule it is these additional substances or combinations of substances that are required to be frothed or brought to a stable foam rather than the rosin itself, the rosin, therefore, acting as an agent to froth the desired substances. It is difficult, if not impossible to state a definite percentage of the rosin to be employed relative to the mass to be whipped. The frothing property of the rosin is available in a wide range of concentrates. Its use and efficacy depend on the material to be whipped, the degree of alkalinity of the mix, the extent of the froth desired, and, with some materials, the temperature at which the whipping takes place, and also the period of time during which the aeration or whipping is continued, and the means by which such aeration is accomplished, whether mechanical agitation, injection of air or gases, or by chemical reaction for release of gases into the mixture as by the generation of ammonia. However, it may be stated that it has been found effective and efficient to employ rosin content in dilutions of as little as one-tenth of one per cent by weight of the mass to be frothed, especially where such mass includes a substantial part of gelatinized substances such as starch or karatin.

As previously stated, the most satisfactory froth resultant from inclusion of rosin in the mass is effected when the mass solution of ingredients is on the alkaline side. From experiments it has been determined that the alkalinity reading should preferably be in the vicinity of pH 13.0–9.0. This alkalinity of the mass may result from the inclusion of a quantity of the addition-stock, the formula of which is given above. However, the saponification of the rosin may be also accomplished by inclusion of alkaline ingredients in the mass itself, in which case, if the solution of the mass in sufficiently alkaline, the powdered rosin may be added directly to the mass solution of ingredients, the alkali therein serving to react on the rosin rapidly enough to produce sufficient resinate to froth the mass satisfactorily.

An additional advantageous employment of the inclusion of rosin as a frothing agent in a neutralized or alkaline environment is that it exhibits a marked exhilarating effect by increasing the degree of frothing in a shorter time and over a wide range of temperatures when used with materials which normally resist frothing or which will froth satisfactorily only at certain temperatures. In the case of certain organic substances, as for instance the proteins which may normally be frothed without the addition of rosin or its products, the inclusion of rosin causes a marked increase of frothing in a much shorter time. The majority of these organic protein substances require low temperatures to be maintained in order to produce a satisfactory aerated whip by mechanical agitation, whereas, with the addition of a small percentage of resinate they may be made to froth to an even greater extent and without being maintained at low temperatures. The employment in a mixture of a protein such as casein serves to exemplify the advantages of the inclusion of rosin in the mass. For instance, in preparing an aerated slurry for wall board the following results have been demonstrated:

A prepared slurry of 23% diatomaceous earth, 1% wood pulp fibre, 0.7% starch flour, 1% casein, 0.4% caustic sodium hydroxide, 0.2% calcium hydroxide, (lime), and approximately 73.7% water, the mix utilizing the casein as a frothing agent, whips as follows:

| Temperature | Increased volume without inclusion of Rosin with 10 min. mechanical agitation |
|---|---|
| | Percent |
| 45 degrees Fahrenheit | 73 |
| 55 degrees Fahrenheit | 61 |
| 70 degrees Fahrenheit | 29 |
| 80 degrees Fahrenheit | 22 |
| 90 degrees Fahrenheit | 10 |

As this slurry is quite alkaline, free rosin (powdered) may be employed as a substitute for its saponified product. The results of the addition of rosin to the same slurry is as follows, the percentages of rosin being based on the slurry mass as 100%, and the same period, 10 minutes, of mechanical agitation being employed:

| Temperature | Increase of volume with 0.2 of 1% rosin powder | Increase of volume with 1.0% of rosin powder |
|---|---|---|
| | Percent | Percent |
| 45 degrees Fahrenheit | 75 | 93 |
| 55 degrees Fahrenheit | 65 | 79 |
| 70 degrees Fahrenheit | 44 | 82 |
| 80 degrees Fahrenheit | 45 | 88 |
| 90 degrees Fahrenheit | 93 | 111 |

With the employment of saponified rosin in the mass, these percentages of increase of volume due to aeration become even greater. At 80° F. one-tenth of one per cent (0.1 of 1%) of saponified rosin (sodium resinate) with the same slurry and with the same period of mechanical agitation, will increase its volume 90% in comparison with the 22% increase obtained at the same temperature without the use of any rosin.

Of course, it is to be understood that in order to make the above slurry into a wallboard, whether aerated or not, it is necessary to form slabs and suitably bake the product, this application being directed to the inclusion of rosin as a frothing agent in an alkaline environment in a method of making wall board of particular types of base material.

Another advantage in the use of rosin or its saponified product as a whipping or frothing agent is that it may also be utilized as a basis for providing a water-resisting agent in the finished product, after it has served its purpose to facilitate aeration. Free rosin is in itself a water-resisting material. The saponified rosin, though soluble, may be set into an insoluble state by the addition of suitable metal precipitating compound. In the original slurry example given above, by the inclusion of approximately two-tenths of one per cent (0.2 of 1%) of sodium resinate, and approximately one-half of one per cent (0.5 of 1%) of copper sulphate suitably alkalized with approximately three-tenths of one per cent (0.3 of 1%) of aqua ammonia, the completed and baked wallboard of the above slurry gained only 11% in weight upon five minutes immersion in water, whereas wallboard made of the same slurry treated under similar baking conditions without the copper sulphate and sodium resinate gained 387% in weight upon five minutes immersion in water.

Another advantage of the inclusion of rosin or its saponified product is that it is relatively independent of the chemicals present in solution or the "hardness" of water, which is not the case with the fatty acids and their soluble soaps. A small percentage of certain chemicals in solution is sufficient to "kill" the whipping action of the normal soaps such as sodium stearate, oleate, etc.

Where the term stabilized froth is employed, it is to be considered as meaning the maintenance of a froth over an extended period of time due to viscosity of the mix which is treated, but not necessarily a permanent froth unless the material is such that the body thereof, upon drying of the liquid therefrom, becomes a permanent aerated structure, such as the baked wallboard referred to in the above example.

In Patent No. 2,316,998, granted on April 20, 1943, on my co-pending application, there is disclosed a formed board product and method of making same. In the present application I have disclosed the method of forming a stabilized froth in such a method by employing resin as a frothing agent while maintaining the slurry alkaline.

The foregoing description and exemplification of the invention is not to be construed as a specific limitation thereof, it being contemplated that changes may be made in details without sacrificing the advantages or departing from the spirit of the invention as defined in the appended claims.

Having thus described my invention, what I claim and desire to secure by Letters Patent of the United States is:

1. A method of facilitating the formation of a stabilized froth in a fluidified mass of inert material, comprising the steps of mixing a fluid mass having its principal bulk of solid component consisting of pulverized earthy material chemically inert upon subjection to water, including therewith fibrous material and a starch-included glue binder, introducing soluble rosin into said mass, and maintaining said mass alkaline while aerating the mass.

2. A method of facilitating the formation of a stabilized froth in a fluidified mass of inert earthy material, comprising the steps of mixing a fluid mass having its principal bulk of solid component consisting of pulverized diatomaceous earth, including therewith fibrous material and a starch-included glue binder, introducing soluble rosin into said mass, and maintaining said mass alkaline while aerating the mass.

3. A method of facilitating the formation of a stabilized froth in a fluidified mass of inert earthy material comprising the steps of mixing a fluid mass having its principal bulk of said component consisting of pulverized earthy material chemically inert upon subjection to water, including therewith sufficient fibrous material and a starch-included glue binder to sustain the froth when formed, introducing soluble rosin into said mass, and maintaining said mass alkaline while mechanically whipping the mass.

4. A method of facilitating the formation of a stabilized froth in a fluidified mass of inert earthy material, comprising the steps of mixing a fluid mass having its principal bulk of solid component consisting of pulverized inherently highly absorbent cellular material chemically inert upon subjection to water, including therewith sufficient fibrous material and a starch-included glue binder to sustain the froth when formed, introducing soluble rosin into said mass, and maintaining said mass alkaline while mechanically whipping the mass.

5. A method of facilitating the formation of a stabilized froth in a fluidified mass of inert material, comprising the steps of mixing a fluid mass having its principal bulk of solid component consisting of pulverized earthy material chemically inert upon subjection to water, including therewith sufficient fibrous material and a starch-included glue binder to sustain the froth when formed, introducing soluble rosin into said mass, and maintaining said mass alkaline within a range of substantially pH 13.0–9.0, while aerating the mass.

6. A method of facilitating the formation of a stabilized froth in a fluidified mass of inert earthy material, comprising the steps of mixing a fluid mass having its principal bulk of solid component consisting of pulverized diatomaceous earth, including therewith sufficient fibrous material and a starch-included glue binder to sustain the froth when formed, introducing soluble rosin into said mass, and maintaining said mass alkaline within a range of substantially pH 13.0–9.0, while aerating the mass.

7. A method of facilitating the formation of a stabilized froth in a fluidified mass of inert earthy material comprising the steps of mixing a fluid mass having its principal bulk of solid component consisting of pulverized earthy material chemically inert upon subjection to water, including therewith sufficient fibrous material and a starch-included glue binder to sustain the froth when formed, introducing soluble rosin into said mass, and maintaining said mass alkaline within a range of substantially pH 13.0–9.0, while mechanically whipping the mass.

8. A method of facilitating the formation of a stabilized froth in a fluidified mass of inert earthy material, comprising the steps of mixing a fluid mass having its principal bulk of solid component consisting of pulverized inherently highly absorbent cellular material chemically inert upon subjection to water, including therewith sufficient fibrous material and a starch-included glue binder to sustain the froth when formed, introducing soluble rosin into said mass, and maintaining said mass alkaline within a range of substantially pH 13.0–9.0, while mechanically whipping the mass.

NATHANIEL L. SMITH.